(12) United States Patent
Jain et al.

(10) Patent No.: US 8,115,777 B2
(45) Date of Patent: Feb. 14, 2012

(54) ENHANCING CONTACT CENTER INTERACTIONS FOR PEOPLE HAVING IMPAIRED SENSES

(75) Inventors: Mukul Jain, San Jose, CA (US);
Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1266 days.

(21) Appl. No.: 11/769,601

(22) Filed: Jun. 27, 2007

(65) Prior Publication Data
US 2009/0003578 A1 Jan. 1, 2009

(51) Int. Cl.
*G09G 5/02* (2006.01)
(52) U.S. Cl. ........... 345/594; 345/593; 379/265.01
(58) Field of Classification Search ............ 379/265.01
See application file for complete search history.

(56) References Cited

U.S. PATENT DOCUMENTS

| 6,985,524 B1 | 1/2006 | Borchers | |
|---|---|---|---|
| 2005/0041040 A1* | 2/2005 | Fukuda et al. | 345/619 |
| 2006/0285659 A1* | 12/2006 | Suryanarayana et al. | 379/88.02 |
| 2007/0273708 A1* | 11/2007 | Andreasson et al. | 345/593 |
| 2008/0077858 A1* | 3/2008 | Asakawa et al. | 715/255 |
| 2008/0122709 A1* | 5/2008 | Ding | 343/715 |

* cited by examiner

*Primary Examiner* — Creighton Smith
(74) *Attorney, Agent, or Firm* — Schwegman, Lundberg & Woessner, P.A.

(57) ABSTRACT

A method and apparatus is provided for emulating an impairment of a person. The method comprises determining a type of sensory impairment of a person communicating with an agent endpoint device and applying a configuration filter corresponding to the determined type of sensory impairment to output at the agent endpoint device to emulate the sensory impairment of the person. Determining the type of sensory impairment may comprise determining a hearing impairment of the person or a type of color-blindness of the person.

21 Claims, 7 Drawing Sheets

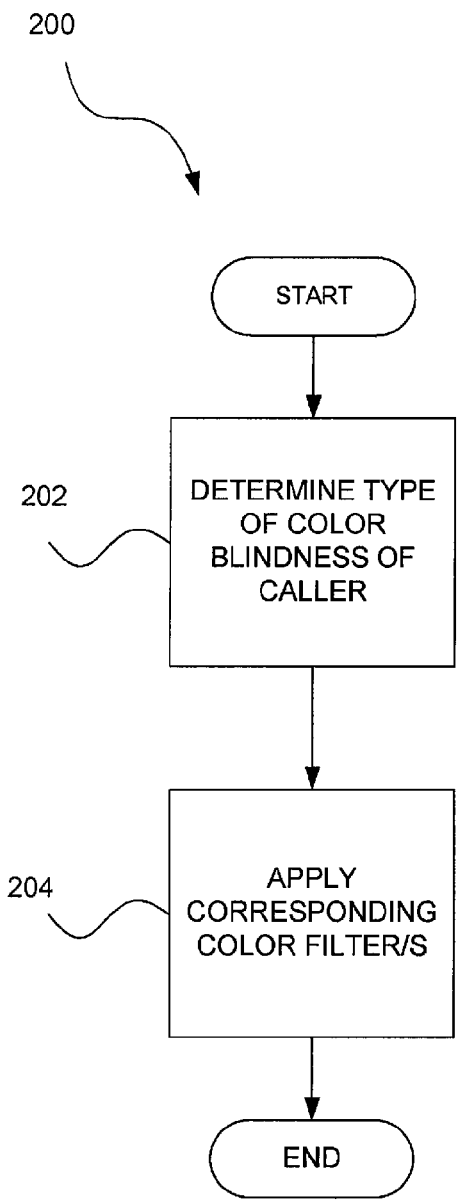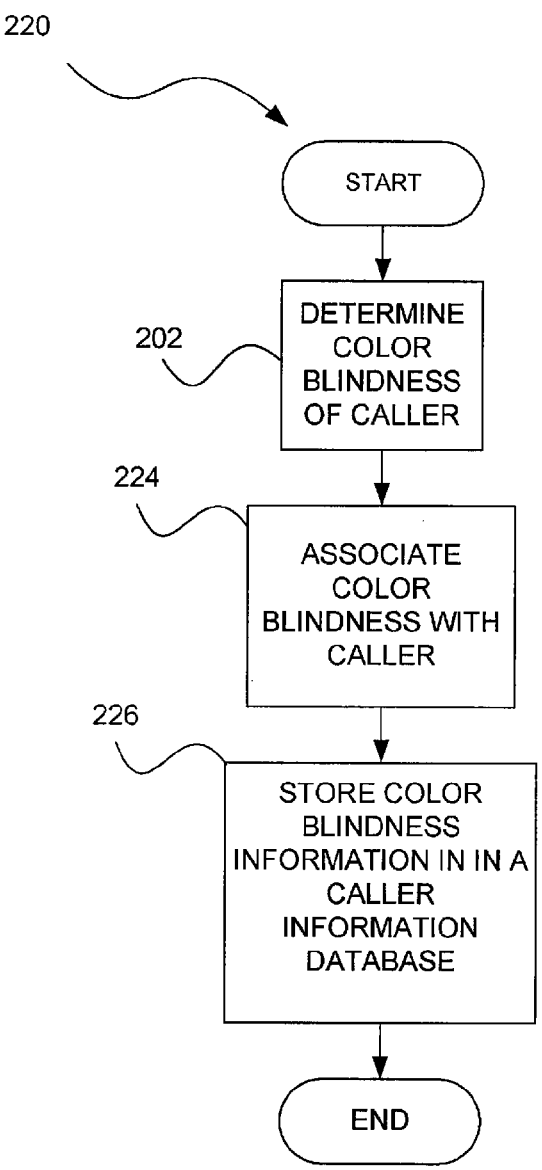
FIG. 4
FIG. 5

ENHANCING CONTACT CENTER INTERACTIONS FOR PEOPLE HAVING IMPAIRED SENSES

FIELD

The present disclosure relates generally to contact centers, particularly to the interaction of callers or users of contact centers with agents of the contact centers.

BACKGROUND

Sensory impairments, such as color-blindness and hearing impairments, affect a considerable number of people worldwide. Color-blindness, for example, is usually a genetic vision impairment wherein several different variations and degrees of color vision deficiencies are experienced by the affected population. Color-blind people often experience great difficulty in performing certain tasks which non color-blind people consider trivial, for example, identifying indicators such as Light Emitting Diodes (LEDs) of different colors on electronic devices or different colored icons on a desktop.

Lenses are available which allow color-blind people to perceive different colors by altering the contrast of the colors. However, when communicating with non color-blind people the color-blind person may still experience great difficulty in following the non color-blind person's reference to a particular color. For example, during an interaction with an agent of a contact center of an Internet Service Provider, a color-blind person would not be able to perceive a particular color LED on a DSL/cable modem router.

BRIEF DESCRIPTION OF DRAWINGS

Example embodiments are illustrated by way of example and not limitation in the figures of the accompanying drawings, in which like references indicate similar elements and in which:

FIG. 4 shows a high-level flow diagram of a method, in accordance with an example embodiment, of enhancing communications between an agent of a contact center and a color-blind caller contacting the contact center;

FIG. 5 shows a high level flow diagram of a method, in accordance with an example embodiment, of registering color-blindness information of a caller contacting the contact center;

DESCRIPTION OF EXAMPLE EMBODIMENTS

In the following description, for purposes of explanation, numerous specific details are set forth to provide a thorough understanding of example embodiments. It will be evident, however, to one skilled in the art that the present embodiments or other embodiments may be practiced without these specific details.

Overview

In an example embodiment, there is provided a method and apparatus for emulating an impairment of a person. The method may comprise determining a type of sensory impairment of a person communicating with an agent endpoint device and applying a configuration filter corresponding to the determined type of sensory impairment to an output at the agent endpoint device to emulate the sensory impairment of the person. Determining the type of sensory impairment may comprise determining a hearing impairment of the person or a type of color-blindness of the person.

Example Embodiments

Figure 1:
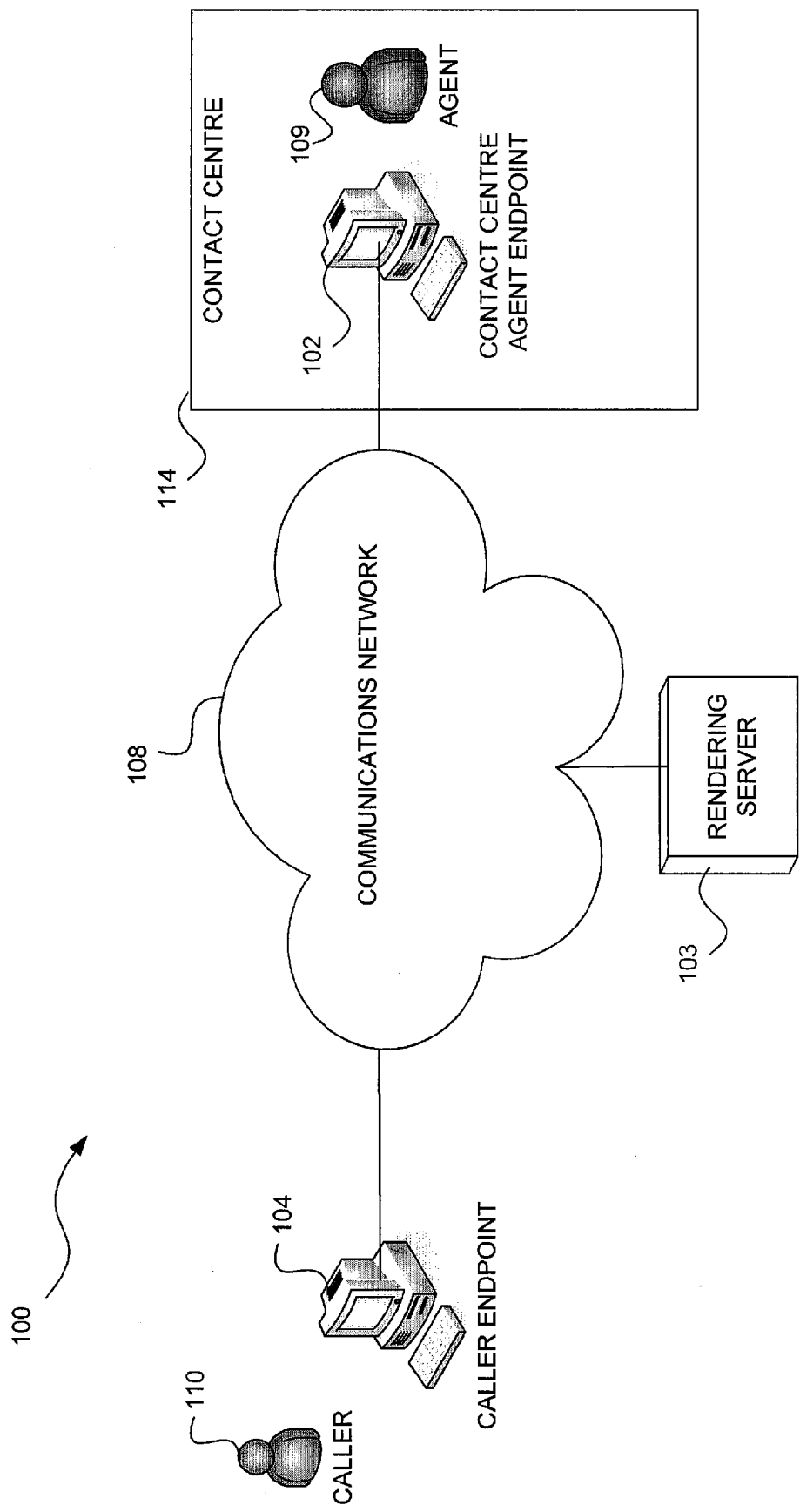
FIG. 1 shows a system which comprising a contact center agent endpoint device and user endpoint device, in accordance with an example embodiment.

FIG. 1 shows a system 100, in accordance with an example embodiment, which includes apparatus to allow a user to communicate with a contact center agent. In an example embodiment, the system 100 is shown to include a contact center agent endpoint device 102 and a user or caller endpoint device 104. The caller endpoint device 104 may be operated by a person or human caller 110. In this regard, the agent endpoint device 102 may also be operated by a human contact center agent 109. In an example embodiment, the contact center agent 109 is a member of a contact center 114 that provides help or assistance, e.g., technical support, to users thereof or callers thereto over a communication network 108. The contact center 114 may be a call center, an Internet-based online helpdesk, an emergency response help desk (e.g., a 911 helpdesk), or the like. The contact center 114 may therefore include a plurality of agent endpoint devices 102 and agents 109, however, for illustrative purposes reference will only be made to one agent 109 and the associated agent endpoint device 102. Similarly, the system 100 may include one or more callers to the contact center 114 and via one or more caller endpoint devices. However, for ease of explanation, reference will only be made to one caller 110 and one associated endpoint device 104.

In an example embodiment, the caller 110 has a sensory impairment in the form of color-blindness, whereas the agent 109 of the call center 114 is not color-blind. It is to be appreciated that the invention may be applicable in instances where callers have other sensory impairments, for example, hearing impairments. Thus, example embodiments are described merely by way of example with reference to color-blindness.

The endpoint devices 102 and 104 may be operable to display visual data, for example images or video, to the caller 110 and the agent 109 respectively. The images or video displayed to caller 110, by way of the endpoint device 104, is also displayed or displayable on the endpoint device 102 for viewing by the agent 109. Thus, the agent 109, viewing the endpoint device 102, shares the same or similar view of the images or video displayed to the caller 110 thereby providing a shared or common view and enabling the agent 109 to help the caller 110. However, since the caller 110 is color-blind, he/she may have a different visual perception of the image or video presented to him/her as compared to visual perception of the agent 109 viewing the same image or video. Thus, in an example embodiment, the contact center endpoint device 102 may be operable to emulate the impaired visual perception of the color-blind caller 110 by modifying the images or video viewed by to the agent 109. Thus, the actual image or video displayed on the endpoint device 102 is modified to correspond to the image or video as perceived or seen by the color-blind caller 110. It is to be understood that "image or video," within the context of the specification, may be understood to include any visual representation seen by the caller 110 or agent 109 on the endpoint device 104 or 102 respectively.

By way of example, the endpoint devices 102 and 104 may be in the form of video telephones, for instance VoIP video telephones, operable to connect to the communications network 108 thereby to allow communication between the devices 102, 104 and therefore between the caller 110 and the agent 109 respectively. Instead, or in addition, the endpoint devices 102 and 104 may be in the form of video terminals or kiosks, or the like, operable to communicate voice and video and/or images between the caller 110 and the agent 109. In this regard, the communications network 108 may be a packet-switched network and may form part of the Internet. Instead, the communications network 108 may be a circuit switched network, public switched data network, or the like.

In other embodiments, one or both of the endpoint devices 102 or 104 may be PDAs (Personal Digital Assistants), PCs (Personal Computers), mobile telephones, or the like, operable to communicate with each other over the communications network 108 thereby to display images and/or video to the agent 109 and the caller 110.

A rendering server 103 may be in communication with or form part of the communications network 108. The rendering server 103 may be operable to render a multimedia stream simultaneously to the agent 109 and the caller 110. The multimedia stream may contain static images, video, voice, or any media combination. In this regard, the rendering server 103 may be in the form of a web server rendering web pages with images, a video source, and/or an audio source, for example an IVR (Interactive Voice Response) system.

It is to be appreciated that when the caller 110 contacts the contact center 114 for assistance, in addition to viewing the same images or video on the endpoint devices 104 and 102, the caller 110 and the agent 109 may communicate with each other by audio (e.g. voice) over the communications network 108 by way of the endpoint devices 104 and 102. Instead, or in addition, the caller 110 and the agent 109 may communicate with each other by voice by way of a separate landline telephone, VoIP telephone, cellular telephone, or the like. In an example embodiment where a hearing impaired caller 110 and the agent 109 are conferenced, for example with an IVR system, the agent 109 may assist the caller 110 to navigate through the menu of the IVR system. In an example embodiment an audio filter may applied to distort an output heard by the agent to simulate the audio perception of the hearing impaired caller.

Figure 2:
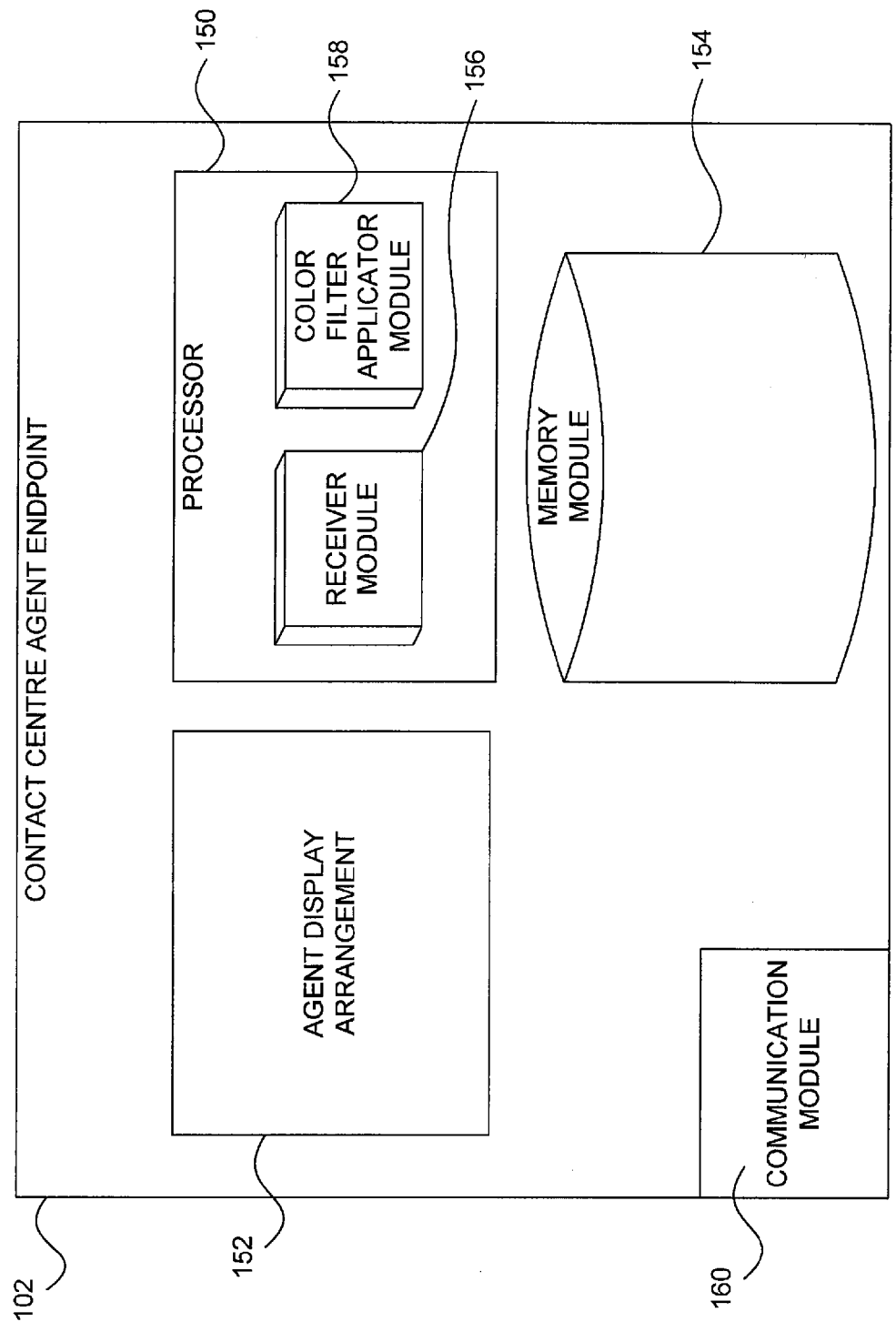
FIGS. 2 and 3 show a contact centre agent endpoint device, in accordance with an example embodiment.
Figure 3:
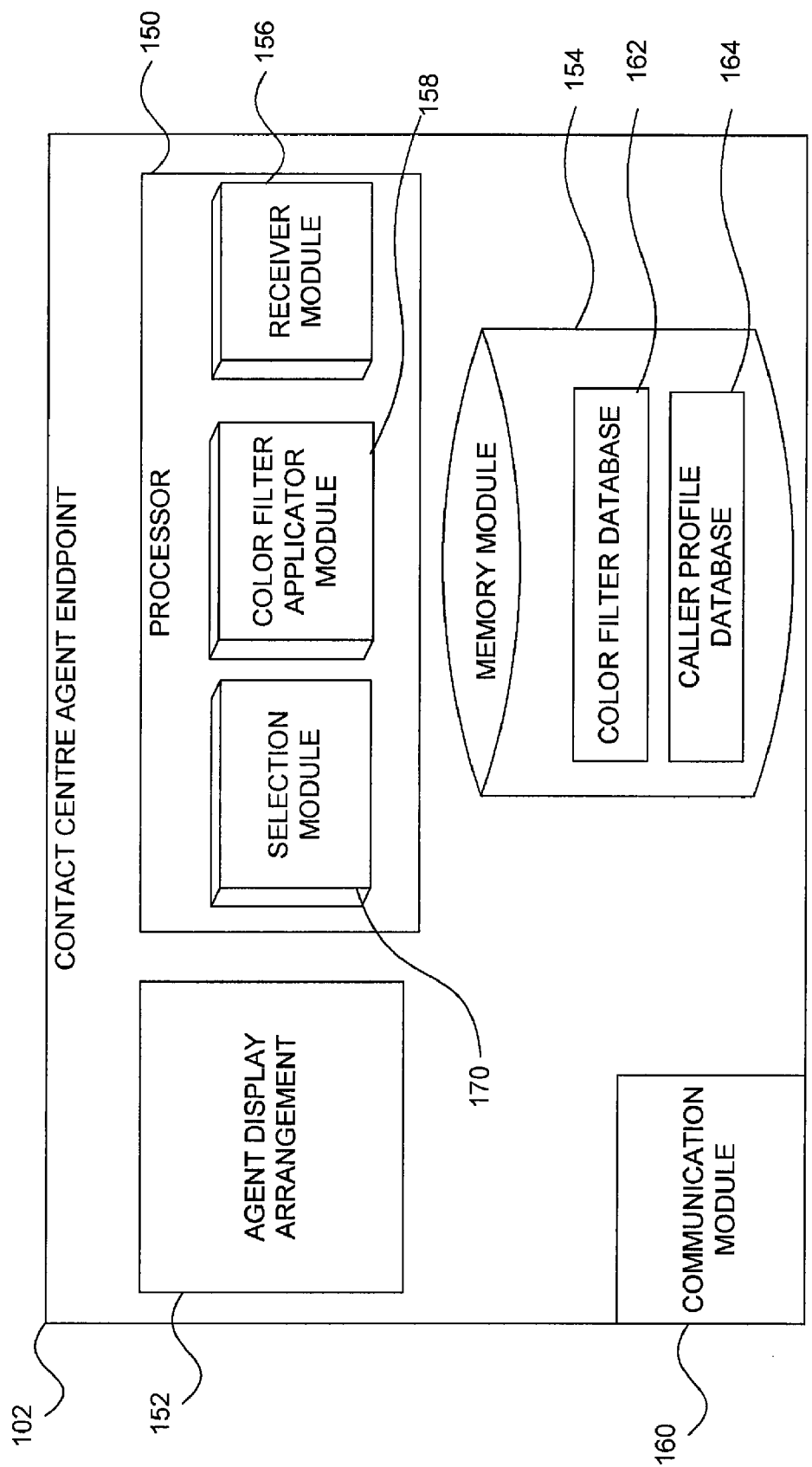

Referring now also to FIGS. 2 and 3, the contact center endpoint device 102 is shown by way of example to include a plurality of functional components. It is to be appreciated that the functional components are not necessarily consolidated into one device, but may be distributed among a number of devices.

Broadly in an example embodiment, the endpoint device 102 may be in the form of a VoIP video telephone which includes a processor 150, an agent display arrangement 152, a memory module 154, and a communication module 160. The processor 150 may comprise or define a receiver module 156 and a color filter applicator module 158 that are conceptual modules corresponding to functional tasks performed by the processor 150. To this end, the endpoint device 102 may include a machine-readable medium, e.g. memory in the processor 150, main memory, and/or hard disk drive, which carries a set of instructions to direct the operation of the processor 150. It is to be understood that the processor 150 may be one or more microprocessors, controllers, or any other suitable computing device, resource, hardware, software, or embedded logic. It is to be noted that, for the purposes of this specification, the term "module" includes an identifiable portion of code, computational or executable instructions, data, or computational object to achieve a particular function, operation, processing, or procedure. A module need not be implemented in software; a module may be implemented in software, hardware, or a combination of software and hardware. Further, a module need not be incorporated in the device 102 but may be provided or may reside in the network to which the device is attached or connected such that the device 102 may be operable to use the functionality provided by a module from within the network. It should be noted that the reference to "within the network" as used herein is interchangeable with "attached to the network" as the specific location of the functionality may vary from embodiment to embodiment.

In an example embodiment, the agent display arrangement 152 is in the form of a LCD screen of the video telephone. In other embodiments, the agent display arrangement 152 may be in the form of a computer monitor, a screen of a PDA, television screen (plasma, CRT, or LCD), or the like. The agent display arrangement 152 may be operable to display to the agent 109 the same or similar images and/or video as displayed by the endpoint device 104 or any view seen by the caller 110, the respective views therefore being matched to each other.

The receiver module 156 may be operable to receive information indicative of a particular type color-blindness of the caller 110. The color filter applicator module 158 may be operable to apply a color filter to the agent display unit 152 thereby to emulate, on the agent display arrangement 152, the visual perception of the color-blind caller 110. For example, where a color-blind caller 110 perceives that a colored component displayed on his/her endpoint device 104 such as a red LED is perceived brown as opposed to being red, the application of the color filter by the color filter applicator module 158 will cause the agent display arrangement 152 to display that red LED as brown (which is how the caller 110 perceives the red LED). The agent 109 may then make reference to the red LED, if necessary, by referring to it as the brown LED or referring to the position of the LED in question, instead of referring to the red color thereof. It will be appreciated that the color filter applied to the agent display unit 152 corresponds to the type of color-blindness of the caller 110, as determined from the information received by way of the receiver module 156. In an example embodiment, an automated color-blindness test may be provided to the caller. For example, a menu of options may be presented (e.g., audio prompts) to the caller and the caller may select an appropriate option identifying the nature of his/her visual impairment.

The memory module 154 may be any volatile or non-volatile memory in the endpoint device 102 e.g. in-memory cache of the endpoint device 102, or the like. The memory module 154 may include a color filter database 162 which includes at least one configuration filter associated with or corresponding to a particular type of color-blindness. An "associated or corresponding" filter may be a particular color filter that is operable, in use, to change the appearance of data presented by way of the display arrangement 152 to be visually the same or similar as that perceived by a person with a particular type color-blindness, for example deunatopia, or the like. The color filters may be applied to the video, image, or audio signals presented to the agent 109. In an example embodiment, the color filters are operable, upon application thereof to the display unit 152, to adjust the color scheme of the agent display unit 152 to emulate the view as seen or perceived by the caller 110. The memory module 154 may further include a caller information or profile database 164 that includes personal details of a caller 110, e.g. the nature of the impairment of the caller 110, particularly the type of color-blindness of a caller if he/she is color-blind, so that a particular color filter may be applied automatically upon identification of a visually impaired caller. In this regard, each caller, especially each registered color-blind caller, may have an associated identification code thereby to identify him/her and automatically to apply the associated color filter in response to the receiver module 156 receiving the associated identification code. As mentioned above, the impairment of the caller may however be ascertained at the inception of the call.

Instead, or in addition, if the media includes voice or other audio and the caller 110 is hearing impaired, the endpoint device 102 (or other network device) may be operable to distort the voice that the agent 109 hears to emulate the voice perception of the caller.

The communication module 160 may be operable to facilitate VoIP and video communications. In this regard, the communication module 160 may be operable to transmit, receive, or transfer packets of data over the communications network 108. The packets of data may be static images such as those rendered from web servers, video and voice data. The communication module 160 may be operable to enable communication between the endpoint device 102 and callers to the contact center 114.

In an example embodiment, the endpoint device 102 may further include a selection module 170. The selection module 170 may be operable to select an appropriate color filter or filters from the filter database 162 for application by the applicator module 158 based on the particular type of color-blindness of the caller 110. This may be useful, for example, if the caller 110 has no stored profile but simply explains the nature of his/her impairment to the agent 109.

Example embodiments will now be further described in use with reference to FIGS. 4 to 7. The example methods shown in FIGS. 4 to 7 are described with reference to FIGS. 1 to 3, although it is to be appreciated that the example methods may be applicable to other systems (not illustrated) as well.

FIG. 4 shows a high-level flow diagram of a method 200, in accordance with an example embodiment, of enhancing communications between an agent 109 of a contact center 114 and a color-blind caller 110 contacting the contact center 114. The method 200 comprises determining, at block 202, a particular type of color-blindness of the caller 110. In an example embodiment, the caller 110 may contact the contact center 114, particularly the agent 109 operating the agent endpoint device 102, if he/she requires assistance with a particular matter or technical problem. In order to facilitate the agent 109 assisting the caller 110, the agent endpoint device 102 is operable to display, by way of the agent display arrangement 152, the same data as presented to caller 110 on the endpoint device 104. In this way, the agent 109 has a view on the endpoint device 102 matched to the view which is perceived by the caller 110. However, because of the color-blindness of the caller 110, the caller 110 perceives the data on the endpoint device 104 differently from that perceived by the non color-blind agent 109. The method 200 therefore further comprises applying, at block 204, one or more appropriate color filters corresponding to the type of color-blindness of the caller 110 to the visual representation (video or image) seen by the agent 109. The color filter(s) may be applied to the video, image, or audio signals (namely the multimedia stream) presented to the agent 109. For example, the color filter(s) may be applied to the multimedia stream outputted from the rendering server 103 to the endpoint device 102. In other example embodiments, the color filter(s) may be applied to the agent display 152. The color filter(s) may be applied at the caller endpoint 104 or at the agent endpoint device 102. The application of the color filter(s) at block 204 may for example be effected by the color filter applicator module 158. The application of the color filter(s) causes the agent endpoint device 102 to emulate, on the agent display 152, the visual representation on the endpoint device 104 as would be perceived by the color-blind caller 110. This enables the agent 109 to view, on the endpoint device 102, how the color-blind caller 110 perceives the visual representation. It is to be noted that in another example embodiment, determining a particular type of visual impairment of the caller 110 (at block 202) may include providing the agent 109 with information indicative of the variance between the caller's 110 perceived view of the visual representation and a non color-blind person's perceived view of the same representation. It may also include identifying the caller 110 thereby automatically to determine the nature of the caller's visual impairment from the profile database 164 and in response to such determination, applying automatically the corresponding color filter (at block 204).

Referring now to FIG. 5, a high-level flow diagram of a method 220, in accordance with an example embodiment, is shown. The method 220 may be performed to register the caller 110 with the contact center 114. Like numerals in FIG. 4 refer to the same or similar operations in FIG. 5 unless otherwise indicated. The method 220 may include determining, at block 202, the nature of the visual impairment or type of color-blindness of the caller 110 contacting the contact center 114. The method 220 may be performed when the caller 110 initially calls the contact center 114. The method 220 may further include associating, at block 224, a color-blind status of the caller 110 with caller 110 (e.g., whether the caller 110 is color-blind or not). In the instance where the caller 110 is color-blind, the type of color-blindness of the caller 110 as determined, at block 202, is also associated with the caller 110. The method 220 may then include storing, at block 226, the color-blindness status and the type of color-blindness (if color-blind) associated with the caller 110 in a caller profile of the caller 110 in a caller profile database, for example the caller profile database 164 in the memory module 154. In addition, the caller profile may include information indicative of the appropriate color filter(s) to apply. It is to be appreciated that the caller 110 may be given an identification code thereby to assist in identifying the corresponding caller 110 profile in the caller profile database 164. In an example embodiment, details (e.g. network address or telephone number) of the caller endpoint 104 may be stored thereby automatically to identify the caller 110. Once a caller's profile together with information indicative of his/her color-blindness or color-blindness status is stored in the caller profile database 164, the caller is deemed to be registered with the contact center 114 and an identification code may be assigned to the caller 110 or the caller endpoint device 104.

Figure 6:
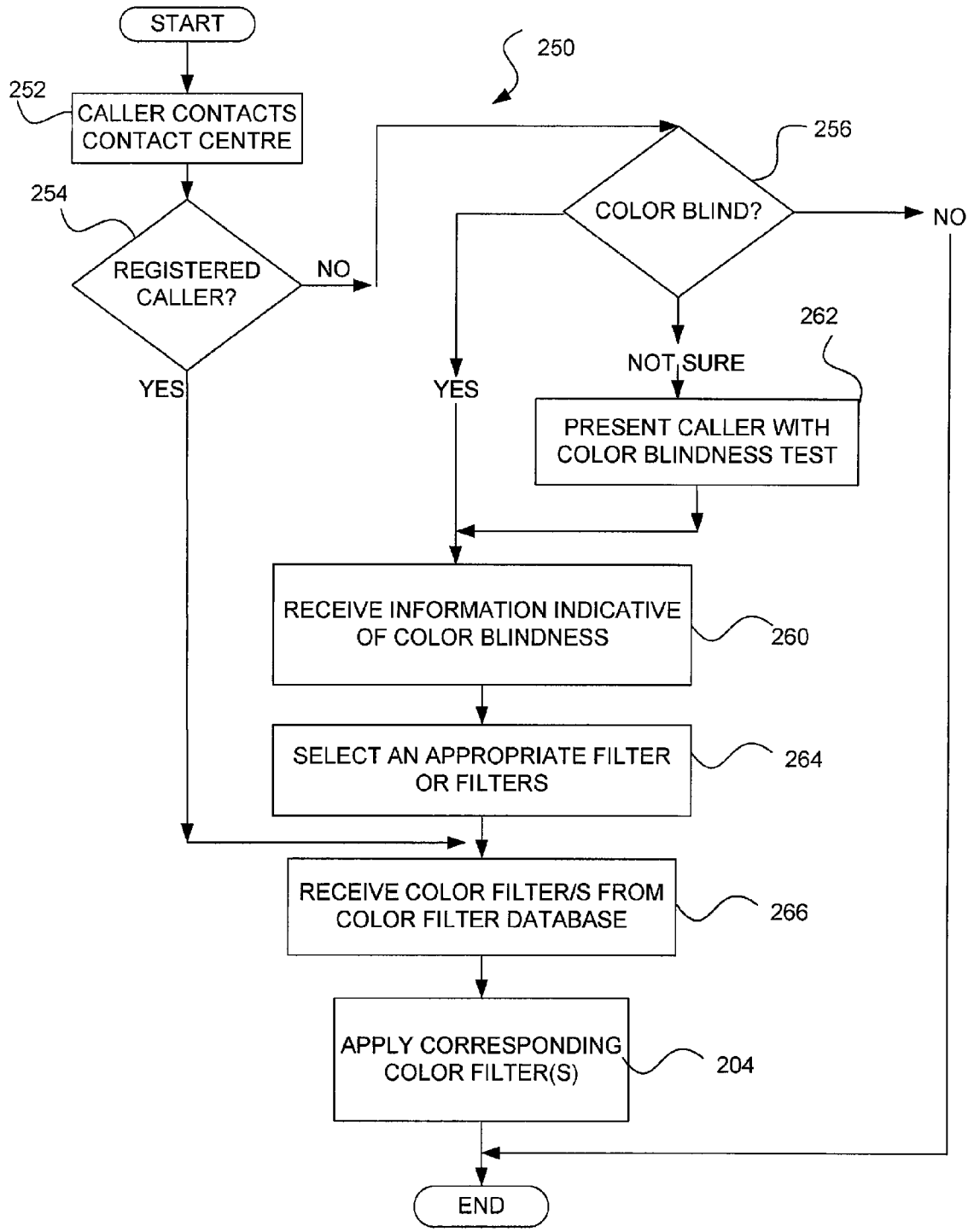
FIG. 6 shows a low-level flow diagram of a method, in accordance with an example embodiment, of enhancing communications between an agent of a contact center and a color-blind caller contacting the contact center.

Referring now to FIG. 6, a low-level flow diagram of a method 250 in accordance with an example embodiment is shown. Like numerals in FIGS. 4 and 5 refer to the same or similar operations in FIG. 6 unless otherwise indicated. The caller 110 may contact, at block 252, the contact center 114 using the endpoint device 104 when he/she requires assistance, for example technical assistance. The caller 110 may call the contact center 114 using the VoIP and video endpoint device 104. It is to be appreciated that the endpoint device 104 contacts, and is in communication with, the endpoint device 102 of the agent 109 over a communications network, for example communications network 108. In an example embodiment, the communication module 160 of the endpoint device 102 may facilitate communication between the endpoint device 102 and the endpoint device 104. In other example embodiments, the endpoint devices 102, 104 need not be in communication with each other for the caller 110 and agent 109 to have the same perception of the data displayed to the caller 110, for example when a color presentation is to be viewed simultaneously by both the caller 110 and the agent 109 from an independent source for example the rendering server 103.

The method 250 may include prompting, at decision block 254, the caller 110 for information to identify if the caller is a registered caller. The caller 110 could be identified automatically. In the instance where the caller 110 is a registered caller, an identification code may be received from the caller 110 and, by using the identification code, a corresponding caller profile of the caller 110 is retrieved from the caller profile database 164. It will be understood that the corresponding caller profile of the caller 110 may be received by way of the receiver module 156 of the endpoint device 102. The caller profile may include information to identify color filter(s), which when applied to the view of the agent 109, emulate the view as perceived by the caller 110. In this regard, the method 250 may include receiving, at block 266, the appropriate color filter(s), in accordance with the information in the caller profile, from the color filter database 162. The method 250 further includes applying, at block 204, the color filter(s) to the visual representation seen by the agent 109. In other example embodiments, where the caller 110 is a registered caller, the appropriate color filter(s) may be automatically applied to the agent endpoint device 102 when the caller 110 contacts the contact center 114. It is to be noted that the caller endpoint device 104 may automatically provide the identification code upon instituting communication with the agent endpoint device 102, thus enabling the color filter(s) to be applied automatically to the agent endpoint device 102. In an example embodiment, the method 250 may include receiving, at block 260, information from the caller profile indicative of the type of color-blindness the caller 110 has. In one example embodiment, the method 250 may include receiving the information from the caller 110 by way of the receiver module 156. The method 250 may therefore also include selecting, at block 264, appropriate color filter(s) based on the particular color-blindness of the caller 110. It is to be appreciated that the selection module 170 may thus be operable to select the appropriate color filter(s) to emulate the caller's 110 visual perception of the representation that the caller views.

In the instance where the caller 110 is not a registered caller, the method 250 may include prompting the caller 110 for information indicative of whether the caller 110 is color-blind or not (see block 256). In the instance where the caller 110 verifies that he/she is color-blind, the method 250 may include receiving, at block 260, information from the caller 110 indicative of the type of color-blindness he/she has. In an example embodiment, the method 250 may include receiving the information from the caller 110 by way of the receiver module 156. The method then includes selecting, at block 264, appropriate color filter(s) based on the particular color-blindness of the caller 110. It is to be appreciated that the selection module 170 may be operable to select the appropriate filter(s). Once the filter(s) are selected the method 250 may include, at block 266, receiving the appropriate color filter(s) from the color filter database 162 by way of the receiver module 156, as hereinbefore described. The method 250 may then include applying the appropriate color filter(s) also as hereinbefore described.

In the instance where the caller 110 provides that he/she is not color-blind, then no color filter needs be applied to the agent endpoint device 102. However, if the caller 110 is not sure whether he/she is color-blind, the method 250 may include presenting, at block 262, the caller 110 with a color-blindness test. The color-blindness test may be presented to the caller 110 on the endpoint device 104. In this regard, the test may be communicated or rendered to the endpoint device 104 from the rendering server 103. In other example embodiments, the color-blindness test may be communicated from the contact center 114, in particular the agent endpoint device 102. The color-blindness test may be an online test. By presenting the caller 110 with the color-blindness test, it may be determined whether or not the caller 110 is color-blind and, if so, what type of color-blindness he/she has. In this regard, the method 250 may include receiving, at block 260, information indicative of the type of color-blindness of the caller 110 from the results of the color-blindness test presented to the caller 110. The method 250 then includes selecting, at block 264, the an appropriate color filter and receiving, at block 266, the appropriate color filter as hereinbefore described. The method 250 then includes applying, at block 204, the color filter(s) also as hereinbefore described.

It is to be appreciated that in an example embodiment, the determination at block 202 of FIGS. 4 and 5 may include the method steps performed at blocks 254 and 256, of FIG. 6. In this regard, the endpoint device 102 may include a determination module operable to determine the type of color-blindness of the caller 110, the receiver module 156 therefore may form part of the determination module. The determining module may therefore be operable to present the color-blindness test to the caller 110 and also to prompt the caller 110 as hereinbefore described with reference to block 256.

Figure 7:
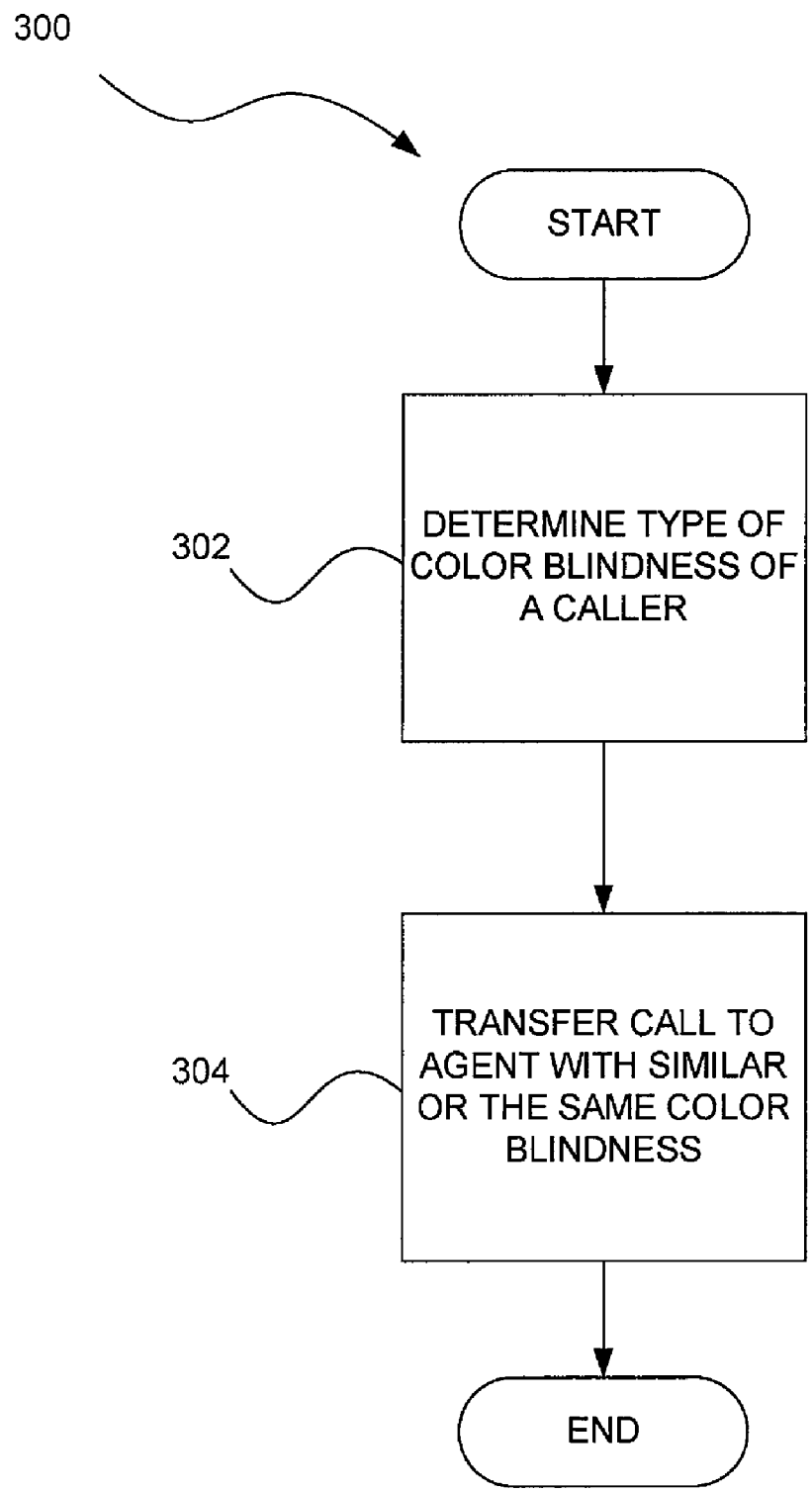
FIG. 7 shows a high-level flow diagram of a method, in accordance with an example embodiment, of enhancing communications between an agent of a contact center and a color-blind caller contacting the contact center.

Referring now to FIG. 7, a high-level flow diagram of a method 300, in accordance with another example embodiment, of enhancing communications between an agent 109 of a contact center 114 and a color-blind caller 110 contacting the contact center 114, is shown. Like numerals in FIGS. 4 and 5 refer to the same or similar operations in FIG. 7 unless otherwise indicated. The method 300 includes determining, at block 302, whether or not the caller 110 is color-blind or not and, if so, then determining the type of color-blindness of the caller 110. The method 300 may thereafter include routing, at block 304, the call made by the caller 110 to an agent 109 of the contact center 114 with the same or similar type of color-blindness as the caller 110 such that the color-blind caller 110 and the color-blind agent 109 have the same view of the data presented on the endpoint devices 104 and 102 respectively.

Example embodiments may provide a view of a visual representation (whatever the color-blind caller 110 sees on a device, display screen, etc.) to an agent 109 of a contact center 114 thereby improving efficiency of communication between contact center agents 109 and color-blind callers 110 thereto. Since non color-blind agents 109 are able to view the visual representation as perceived by the caller 110, the agent is able to assist the caller 110 more effectively thereby increasing caller satisfaction.

Figure 8:
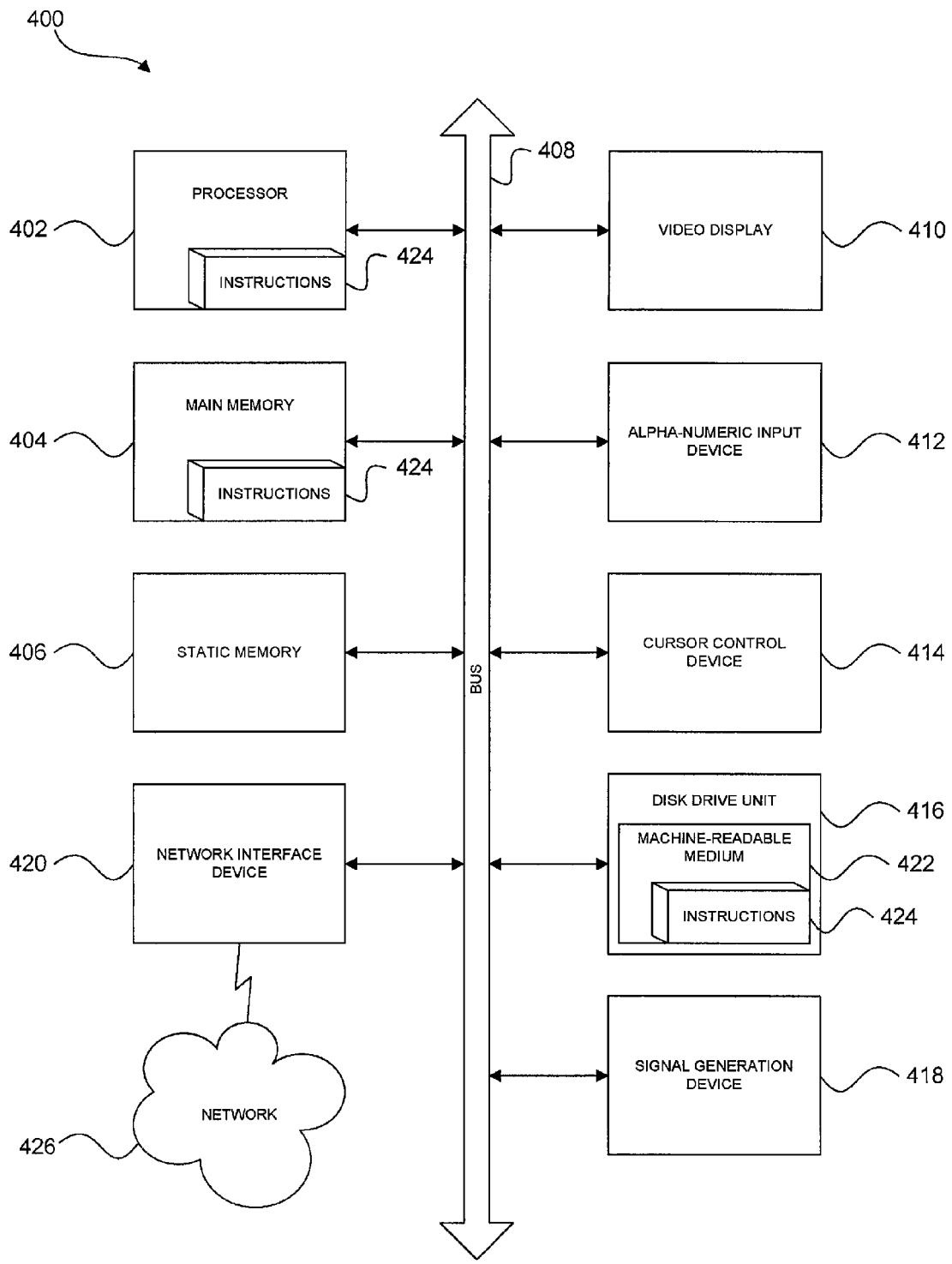
FIG. 8 shows a diagrammatic representation of a machine in the example form of a computer system within which a set of instructions, for causing the machine to perform any one or more of the methodologies discussed herein, may be executed.

FIG. 8 shows a diagrammatic representation of a machine in the example form of a computer system 400 within which a set of instructions, for causing the machine to perform any one or more of the methodologies discussed herein, may be executed. In alternative embodiments, the machine operates as a standalone device or may be connected (e.g., networked)

to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD), plasma display, or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418, and a network interface device 420.

The disk drive unit 416 includes a machine-readable medium 422 on which is stored one or more sets of instructions and data structures (e.g., instructions or software 424) embodying or used by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 using any one of a number of well-known transfer protocols (e.g., FTP). It will be appreciated that the bus 408 may be a high speed network 426.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the example embodiments, or that is capable of storing, encoding, or carrying data structures used by or associated with such a set of instructions. The term "machine-readable medium" shall accordingly be taken to include, but not be limited to, solid-state memories, optical and magnetic media, and carrier wave signals.

The computer 400 may be programmed to perform the functionality of contact center agent endpoint device 102 and/or the caller endpoint device 104.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   determining a type of sensory impairment of a person communicating with an agent endpoint device; and
   applying a configuration filter corresponding to the determined type of sensory impairment to an output at the agent endpoint device to emulate the sensory impairment of the person.

2. The method of claim 1, wherein the determining the type of sensory impairment comprises determining a hearing impairment of the person.

3. The method of claim 1, wherein the determining the type of sensory impairment comprises determining a type of color-blindness of the person.

4. The method of claim 3, comprising receiving information from a user endpoint device, the information being indicative of the type of color-blindness of the person.

5. The method of claim 3, comprising providing an interface at the agent endpoint device to select at least one color filter associated with the type of color-blindness of the person.

6. The method of claim 4, comprising communicating a prompt to the user endpoint device to obtain information indicative of the type of color-blindness of the person.

7. The method of claim 3, comprising:
   receiving an identification code from the user endpoint device, the identification code being associated with the person; and
   retrieving a caller profile from a caller profile database in response to receiving the identification code to determine the type of color-blindness of the person.

8. The method of claim 7, comprising automatically applying a color filter in response to retrieving the caller profile.

9. The method of claim 3, comprising communicating a color-blindness test to a user endpoint device to determine the type of color-blindness of the person.

10. The method of claim 3, comprising:
    storing information indicative of the type of color-blindness of the person in a caller profile database; and
    assigning an identification code to the person.

11. The method of claim 1, wherein the configuration filter is a color filter, the method further comprising applying the color filter to an output of a rendering server configured to provide a multimedia stream to the agent endpoint device.

12. The method of claim 1, wherein the configuration filter is a color filter, the method further comprising applying the color filter at an agent endpoint device.

13. The method of claim 1, wherein the agent endpoint device is provided at a contact center, the method comprising receiving a voice or video telephone call at the contact center from a user endpoint device via a communications network.

14. An apparatus, comprising:
    a display device to display a representation viewed by a person communicating with the apparatus;
    a determining module operable to determine a type of color-blindness of another person to whom the representation is displayed on another display device; and
    a color filter applicator module operable to apply a color filter corresponding to the type of color-blindness to the representation displayed by the display device, to emulate the type of color-blindness of the other person.

15. The apparatus of claim 14, further comprising a selection module operable to select the color filter corresponding to the type of color-blindness.

16. The apparatus of claim 15, further comprising a color filter database that includes a plurality of filters associated with different types of color-blindness.

17. The apparatus of claim 14, further comprising a caller profile database that includes a plurality of caller profiles, each caller profile including data, indicative of a type of color-blindness of a corresponding person.

18. The apparatus of claim 14, further comprising a receiver module operable to receive information indicative of the type of color-blindness.

19. A method comprising:
  receiving at a contact center a communication from a user endpoint device;
  determining a type of color-blindness of a person communicating with the contact center via the user endpoint device; and
  routing the communication to a contact center agent with a similar type of color-blindness.

20. A non-transitory machine-readable medium embodying instructions that, when executed by a machine, cause the machine to:
  determine a type of sensory impairment of a person communicating with an agent endpoint device; and
  apply a configuration filter corresponding to the determined type of sensory impairment to an output at the agent endpoint device to emulate the sensory impairment of the person.

21. An apparatus comprising:
  means for determining a type of sensory impairment of a person communicating with an agent endpoint device; and
  means for applying a configuration filter corresponding to the determined type of sensory impairment to an output at the agent endpoint device to emulate the sensory impairment of the person.

* * * * *

UNITED STATES PATENT AND TRADEMARK OFFICE
CERTIFICATE OF CORRECTION

PATENT NO. : 8,115,777 B2  
APPLICATION NO. : 11/769601  
DATED : February 14, 2012  
INVENTOR(S) : Mukul Jain et al.

Page 1 of 1

It is certified that error appears in the above-identified patent and that said Letters Patent is hereby corrected as shown below:

On the Title page, Item (54), in "Title", in column 1, line 2, delete "HAVING" and insert -- WITH --, therefor.

In column 1, line 2, delete "HAVING" and insert -- WITH --, therefor.

In column 11, line 11, in Claim 17, delete "data," and insert -- data --, therefor.

Signed and Sealed this  
Fifteenth Day of May, 2012

David J. Kappos  
*Director of the United States Patent and Trademark Office*